(12) United States Patent
Thun-Hohenstein et al.

(10) Patent No.: US 11,852,776 B2
(45) Date of Patent: Dec. 26, 2023

(54) DEVICE AND METHOD FOR MONITORING AN AREA AROUND A DOOR

(71) Applicant: IRIS-GMBH INFRARED & INTELLIGENT SENSORS, Berlin (DE)

(72) Inventors: Andreas Thun-Hohenstein, Berlin (DE); Harald Leder, Berlin (DE); Wilfried Wagner, Berlin (DE); Stefan Haun, Magdeburg (DE)

(73) Assignee: IRIS-GMBH INFRARED & INTELLIGENT SENSORS, Berlin (DE)

( * ) Notice: Subject to any disclaimer, the term of this patent is extended or adjusted under 35 U.S.C. 154(b) by 641 days.

(21) Appl. No.: 16/971,408

(22) PCT Filed: Feb. 20, 2019

(86) PCT No.: PCT/EP2019/054156
§ 371 (c)(1),
(2) Date: Aug. 20, 2020

(87) PCT Pub. No.: WO2019/162298
PCT Pub. Date: Aug. 29, 2019

(65) Prior Publication Data
US 2021/0026036 A1 Jan. 28, 2021

(30) Foreign Application Priority Data

Feb. 20, 2018 (DE) .................... 10 2018 103 804.6
Jun. 21, 2018 (DE) .................... 10 2018 115 007.5

(51) Int. Cl.
*G01S 17/02* (2020.01)
*G01V 8/20* (2006.01)
*E05F 15/43* (2015.01)

(52) U.S. Cl.
CPC .............. *G01V 8/20* (2013.01); *E05F 15/43* (2015.01); *E05F 2015/434* (2015.01); *E05Y 2900/531* (2013.01)

(58) Field of Classification Search
CPC . E05F 15/40; E05F 15/43; E05F 15/73; E05F 15/74; G01S 17/06; G01S 17/04;
(Continued)

(56) References Cited

U.S. PATENT DOCUMENTS

| | | | |
|---|---|---|---|
| 5,410,149 A | 4/1995 | Winston, Jr. et al. | |
| 10,620,304 B2 * | 4/2020 | Halbert | G01S 7/003 |
| 11,104,298 B2 * | 8/2021 | Lindic | B60R 25/30 |

FOREIGN PATENT DOCUMENTS

| | | |
|---|---|---|
| DE | 102005011116 | 9/2006 |
| EP | 1152261 | 11/2001 |
| EP | 1752793 | 2/2007 |

OTHER PUBLICATIONS

International Search Report for International (PCT) Patent Application No. PCT/EP2019/054156, dated Jun. 4, 2019, 4 pages.
(Continued)

*Primary Examiner* — Que Tan Le
(74) *Attorney, Agent, or Firm* — Sheridan Ross P.C.

(57) ABSTRACT

A device for monitoring the door area around a that is at least partially glazed door is provided. A transmitter emits a transmission pulse of electromagnetic radiation. An image recorder comprises a receiver matrix having a first receiver blocks which has a plurality of first receivers. The first receivers receive reflected signal components of the transmission pulse. Each first receiver has a memory unit which is designed to integrate and store the reflected signal components received. A control unit triggers a transmission pulse of the transmitter and activates the first receivers for a predetermined first receiving period. An evaluation unit compares topography image data with stored reference
(Continued)

image data or compares a respective distance value with a stored reference value for a door area free of objects.

21 Claims, 6 Drawing Sheets

(58) Field of Classification Search
CPC .......... G01S 17/08; G01S 17/10; G01S 17/88; G01S 17/89; G01V 8/10; G01V 8/20
USPC .................................. 250/221, 214 R, 208.1
See application file for complete search history.

(56) References Cited

OTHER PUBLICATIONS

English Translation of the International Search Report for International (PCT) Patent Application No. PCT/EP2019/054156, dated Jun. 4, 2019, 2 pages.

* cited by examiner

DEVICE AND METHOD FOR MONITORING AN AREA AROUND A DOOR

CROSS REFERENCE TO RELATED APPLICATIONS

This application is a national stage application under 35 U.S.C. 371 and claims the benefit of PCT Application No. PCT/EP2019/054156 having an international filing date of 20 Feb. 2019, which designated the United States, and which PCT application claimed the benefit of German Patent Application No. 102018103804.6 filed 20 Feb. 2018, and German Patent Application No. 102018115007.5 filed 21 Jun. 2018, the contents of each of which are incorporated herein by reference in their entireties.

BACKGROUND

The invention relates to a device and a method for monitoring the door area of an at least partially glazed door.

It is known to monitor an inner door region of automatic doors by means of sensors. The object of this monitoring is to ensure that the automatic closing process of the doors does not start before all persons (or objects) have left the door area. Usually, additional sensors, such as pressure sensors on the door edges or light grids, are used for protection against trapping.

What is known is door area monitoring by means of active infrared sensors with background suppression, where a narrow solid angle along the door leaf is illuminated with short-wave infrared (IR) light. IR LEDs are usually used as the light source. The receivers are arranged in relation to the light sources such that the fields of view of the receivers and the illumination fields cross at a short distance from the background. This solution prevents IR light reflected by the background from getting into the receiver.

New solutions use matrix sensors based on the time-of-flight principle instead of light sensors with background suppression. These sensors have a higher spatial resolution and can identify objects in the door area more precisely via the depth resolution. Just as in case of sensors with background suppression, reflection properties of the background can be largely suppressed. However, these sensor systems currently used in the inner region of the door area do not allow any conclusions as to whether there are people present in an outer region in the proximity of the door and/or intend to enter the door area from the outside, if the doors are closed or almost closed. None of the sensors described above is able to provide monitoring of the outer door region from the inside through a closed door. The infrared light emitted by the two aforementioned sensor types is reflected by the doors and leads to unusable signals. According to the prior art, additional sensors that may also be exposed to the effects of the weather and the like must be installed in the outer region of the door area, in order to provide additional monitoring of the outer region.

SUMMARY

Against this background, it is an object of the invention to provide a device and a method for improved or simplified monitoring of a door area.

According to a first aspect of the invention, this object is achieved by means of a device for monitoring the door area of a door that is at least partially glazed, comprising
at least one transmitter for emitting at least one transmission pulse of electromagnetic radiation, and
an image recorder comprising a receiver matrix having at least one first receiver block, which has a plurality of first receivers. The first receivers of the first receiver block are configured and arranged in such a way that they receive reflected signal components of the transmission pulse in a first predetermined distance range of an outer region of the door area, the distance range being determined in relation to the door. Each first receiver has a memory unit which is configured to integrate and store the reflected signal components received.

In addition, the device comprises a control unit that is connected to the image recorder and the transmitter, and is configured:
to trigger a transmission pulse of the transmitter, and
to activate the first receivers of the first receiver block for a predetermined first receiving period after a predetermined first idle period which is longer than a period in which a signal of the transmission pulse reflected by the glazed door reaches the first receivers of the first receiver block.

Finally, the device comprises an evaluation unit that is configured
to read the stored signal components of the respective receiver and to process them into topography image data, and
to compare the topography image data with stored reference image data for a free door area, or
to read the stored signal components of the respective receiver and to determine a distance value on that basis, and
to compare the respective distance value with a stored reference value for a free door area.

The invention includes the finding that monitoring an outer region of a door area from the inside, as well, is possible based on the time-of-flight principle, if the reflections caused by the door itself can be suppressed. Furthermore, the invention includes the finding that this is preferably carried out such that the signal components reflected on the receiver's end are disregarded during a period during which the signal components reflected by the door are expected. On the one hand, this can be achieved by means of an approach according to which the reception of reflected signal components is only started after an idle period adapted to the transit time of the signals reflected by the door, which is also reflected by a method according to the second aspect of the invention; or by means of an approach, according to which a reflection maximum that, from a chronological point of view, occurs first is automatically assigned to the door and a second maximum, that occurs upon a correspondingly longer transit time, is used for monitoring. The latter corresponds to a method according to a third aspect of the invention.

A method according to the second aspect of the invention comprises the steps of
emitting a transmission pulse of electromagnetic radiation,
receiving reflected signal components of the transmission pulse in a first predetermined distance range of an outer region of the door region for a receiving period after a predetermined first idle period which is longer than a period in which a signal of the transmission pulse reflected by the glazed door reaches the first receivers of the first receiver block,
integrating and storing the reflected signal components received, and
reading the stored signal components, and processing the stored signal components into topography image data and comparing the topography image data with stored reference image data for a free door area, or determining a distance value based on the stored signal components and comparing the respective distance value with a stored reference value for a free door area.

A method according to the third aspect of the invention comprises the steps of emitting a plurality of transmission pulses of electromagnetic radiation at predetermined time intervals, determining a delay time for each emission of a transmission pulse, wherein the delay time increases incrementally with each transmission pulse, delay time, receiving a reflected signal component of the transmission pulse after the respective integrating and storing the reflected signal components received for each transmission pulse, determining a first and a second maximum value of the integrated signal components, wherein the first maximum value was reached at a shorter delay time than the second maximum value, determining a distance value based on the second maximum value, and comparing the respective distance value with a stored reference value for a free door area.

Thus, the invention makes it possible to monitor an outer region of a door area from the inside even when the door is closed, and thus provides the foundation for installing the sensor system for the door area monitoring entirely inside, where it is therefore protected.

Further embodiments of the invention are described below. These features and components can be combined with each other, unless they are expressly described as alternatives.

In one embodiment, the receiver matrix additionally has at least one inner block, which has a plurality of first receivers. The first receivers of the inner block are configured and arranged to receive signal components of the transmission pulse that are reflected in an inner region of the door area. Each first receiver has a memory unit which is configured to integrate and store the reflected signal components received. The control unit is configured to activate the first receivers of the inner block for a predetermined first inner receiving period immediately after the transmission pulse has been triggered. This embodiment allows the monitoring of the inner and outer region of the door area by means of just one shared device.

The transmitter is preferably configured such that the transmission pulse covers the entire inner and/or outer region. However, it is also possible to use multiple transmitters, the transmission pulses of which each only cover certain partial regions of the door area. In case of multiple transmitters, these transmitters may be controlled synchronously or in succession.

In another embodiment, the receiver matrix has a second receiver block, which has a plurality of first receivers. The first receivers of the second receiver block are configured and arranged in such a way that they receive reflected signal components of the transmission pulse in a second predetermined distance range of an outer region of the door area, the distance range being determined in relation to the door. Each receiver has a memory unit in which the reflected signal components received are integrated and stored. The first predetermined distance range is closer to the door than the second predetermined distance range. The control unit of this embodiment is configured to activate the first receivers of the second receiver block for a predetermined second receiving period after a predetermined second idle period which is longer than a period in which a signal of the transmission pulse reflected by the glazed door reaches the first receivers of the second receiver block. The use of a second receiver block allows for an expansion of the monitored part of the outer region in which reflections from the second distance range are taken into account. Preferably, the receivers of the first and second receiver blocks are arranged such that the distance range of the outer region from which they receive reflections has, viewed from the floor, smaller horizontal distances to the door as the height increases. The first and second receiver blocks are preferably configured in a pivotable manner so that they can be aligned in accordance with the local conditions upon installation or be adjusted to changed local conditions later on. In order to further expand the monitored part of the outer region, the receiver matrix additionally has a plurality of further receiver blocks which are designed analogously to the first and second receiver blocks and which are each configured and arranged in such a way that they are able to receive reflections from further parts of the outer region. The control unit is respectively configured to set a corresponding idle period for each receiver block, taking into account the transit time of the signal component reflected by the door. Thus, the use of different blocks that are controlled differently makes it possible to capture different windows of time as partial recordings for each image recording. This can also be described as a location-discrete method.

The method according to the third aspect of the invention, on the other hand, can also be referred to as a time-discrete method. In this case, a separate complete image recording is realized for each window of time. A time-discrete method leads to increased recording and processing speed requirements compared to the location-discrete method. x times the recording and processing speed measured in frames per second (fps) is required for each x number of time zones.

In a second embodiment, an additional second receiver, that is configured and arranged in the same way as the first receiver of the respective node, is arranged immediately adjacent to the first receiver. Each second receiver has a memory unit which is configured to integrate and store the reflected signal components received. In this case, the control unit is configured to activate the second receiver for a predetermined delayed receiving period immediately after the respective receiving period of the respective first receiver. The use of a second receiver in addition to the respective first receiver, wherein, from a chronological point of view, the receiving period of the second receiver takes place after the one of the first receiver, makes it possible to divide the reflected signal components into two groups of distances in height from the floor of the door area based on the transit times in the receiving window defined by the two receiving periods. Thus, the topography image data and/or distance values can be determined more precisely.

The evaluation unit is preferably configured to compare the signal components of the reflected transmission pulse integrated by the first receiver with the signal components of the reflected transmission pulse integrated by the associated second receiver and to correlate them in order to determine an exact distance between the object causing the reflection and the receiver and thus a height of the object based on the relationship between the integrated signal components. Depending on how long the transit time of the reflected transmission pulse is, one part of the transmission pulse may fall in the receiving period of the first receiver and the remainder may fall in the receiving period of the second receiver—at least if the transmission pulse is reflected at such a distance from the device for door area monitoring that it is in any case within the receiving window defined by the two receiving periods.

In one embodiment, additional receivers, for example third and fourth receivers, may be arranged analogously to the second receiver, immediately adjacent to the first receiver, wherein, accordingly, the receiving periods of said additional receivers occur later, in order to allow for a further differentiation of the height. In one embodiment, the receiver matrix has at least one row and at least one column, for example 320 rows and 240 columns, or vice versa. Preferably, each receiver block of the receiver matrix in this embodiment has 320 columns and the total of the rows of all receiver blocks combined amounts to 240 lines. Depending on the application, larger or smaller receiver matrices may be provided, e.g. 640 columns and 480 rows (VGA) etc.

In another embodiment, the control unit is configured to trigger a transmission pulse of the transmitter and to activate the respective receivers multiple times. In this case, the memory unit of each receiver is configured to integrate and store the reflected signal components received of the respective receiver over multiple receiving periods of the receiver. Furthermore, the control unit is configured to activate the evaluation unit only after integration over multiple receiving periods. With the help of repeated image recording, the signal levels of the reflected signal components received in the respective receivers can be improved, thus facilitating the evaluation and improving its accuracy. In this case, it is preferred if the control unit is configured to trigger transmission pulses of the transmitter and to activate the receivers until a predetermined signal level is reached in all memory units through integration, and to only activate the evaluation unit at that point in time.

The transmission pulse may have any signal form and be, in particular, a square pulse, a pulse sequence or a sinusoidal modulated light signal. The transmitter may, for example, be configured as at least one pulsed laser diode, preferably with a wavelength in the infrared range or in the near infrared range. The control unit may comprise a field-programmable gate array (FGPA) or logic cells.

If the transmission pulse is a sinusoidally modulated light signal, the receiving times of a second or also of a third and fourth receiver will preferably be selected such that specific phase positions, for example 90° or 180°, of the reflected signal components are recorded within the respective receiving period.

The door is preferably a vehicle door, in particular a bus, tram or train door. Furthermore, it is preferred if the door is an automatic door.

Especially due to the increasing automation of vehicles, the invention is becoming more and more important. The primary field of application is therefore the monitoring of automatic doors, especially in public transport vehicles, such as buses and trains.

In one embodiment, the evaluation unit is configured to emit a warning signal and/or to emit a signal for opening the door or a signal for keeping a door open to a door control unit of the door in case of significant differences between the image data and the reference image data, or if the distance value is smaller than a stored reference value. The emission of a warning signal can, in case of vehicle doors for example, alert the driver to persons or objects that are still outside the vehicle in the door area. With the help of the door opening signal, the door can be automatically opened for objects in the outer region. Alternatively, a signal to keep the door open can be used to keep the door open as long as there are persons in the outer region. Therefore, in addition to a pure monitoring of door areas, another application of the described invention is the automatic opening of automatic doors. This is an application that is used in particular in building automation, but is also used in the area of vehicle doors in public transport.

As part of one embodiment of the invention, the monitored door area is marked by an active projection onto the floor. Such an option can for example be implemented through the activation of a projection laser diode (such as a VCSEL with an upstream diffractive optical element).

In one embodiment of the method according to the third aspect of the invention, topography image data is generated from the determined distances and compared with the stored reference image data for a free door area. As already described above, the evaluation of the image data is achieved by means of reference data. A reference signal image will be created when the door area can be considered to be free in all segments. Typically, this referencing is implemented via a teaching process. This teaching process can be realized through manual teaching. This is particularly suitable if the door area is known and if images of the door area are known.

In another embodiment, the stored reference image data is recorded in accordance with the respective method of the second or third aspect of the invention when it is known that the door area is free. Alternatively, the stored reference image data can be generated statically; in this case, a plurality of topography image data is generated and compared, and topography image data that remains unchanged over a predefined period of time is defined as reference image data. This means that a large number of recorded images are compared with each other with regard to their internal dynamics, i.e. the change of the image content over time. Images that turn out to be constant over a defined period of time form a stable background and are subsequently set as reference images. The presently described time-of-flight method provides the best prerequisites for this assessment, since it has proven stable to changes in ambient light, shadows, and changes in the reflective behavior of the ground (for example due to wetness).

In another embodiment, the reference image data or the reference values are stored centrally. In applications where the doors are vehicle doors of public transport vehicles, the reference data can for example be recorded and stored by means of a central image memory (cloud) and the reference image data of the outer regions of the door areas can be dynamically provided to the vehicles. This approach is particularly advantageous when the height of the curb or, in case of trains, the height of the platform at the different stops of a network is different. The reference data may either be transferred once in the vehicle depot at the time when the route is set (for example via WLAN) or dynamically while the vehicle is in use (for example via LTE). Alternatively, the reference image data of the outer region of the door area may also be integrated in the map material of the digital route maps used.

The description of the method, on the one hand, and of the device, on the other, are meant to be complementary to one another. Especially features of the device that are explicitly or implicitly described in connection with the method are each individually or in combination with each other also to be considered features of an exemplary embodiment of the device and vice versa.

BRIEF DESCRIPTION OF THE DRAWINGS

Exemplary embodiments of the invention are described below based on figures, wherein the figures show the following.

DESCRIPTION

Figure 1:
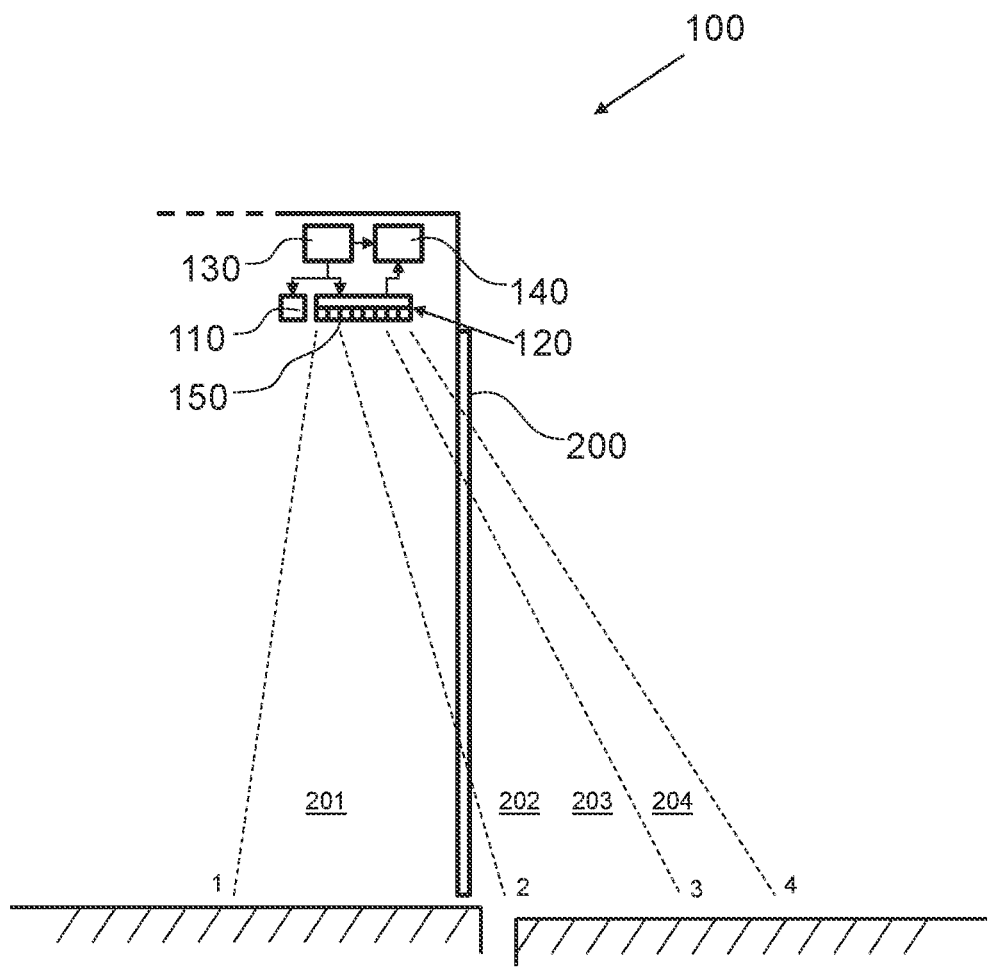
FIG. 1 shows schematically an exemplary embodiment of a device for door area monitoring according to the first aspect of the invention.

FIG. 1 shows schematically an exemplary embodiment of a device 100 for door area monitoring according to the first aspect of the invention and the door area of a partially glazed door 200 monitored by means of said device. The device 100 comprises a transmitter 110 for transmitting at least one transmission pulse of electromagnetic radiation, and an image recorder 120. Furthermore, in the embodiment shown, the device 100 comprises a control unit 130 connected to the image recorder 120 and the transmitter 110 as well as an evaluation unit 140. The image recorder 120 comprises a receiver matrix 150 with an inner block I and three receiver blocks II, III, and IV. The distance ranges 201, 202, 203, 204 respectively covered by the blocks are marked in FIG. 1. Accordingly, the receiver matrix 150 is composed of: the inner block I with m1 rows and n1 columns, the first receiver block II with m2 rows and n2 columns, the second receiver block III with m3 rows and n3 columns and the third receiver block IV with m4 rows and n4 columns. In the specific example, the image recorder 120 has the format of 320×240 (QVGA). While it is expediently defined that n1=n2=n3=n4=240— i.e. that the columns extend over the entire width of the sensor —, the rows are distributed as follows: m1=160, m2=100, m3=40, m4=20. Each receiver block II, III, IV has a plurality of first receivers A2, A3 and A4 in accordance with the columns and rows, and, respectively, a second receiver B2, B3 and B4 immediately adjacent to the first receiver A2, A3 and A4. The inner block I also has a plurality of first receivers A1 and associated second receivers B1.

Figure 2:
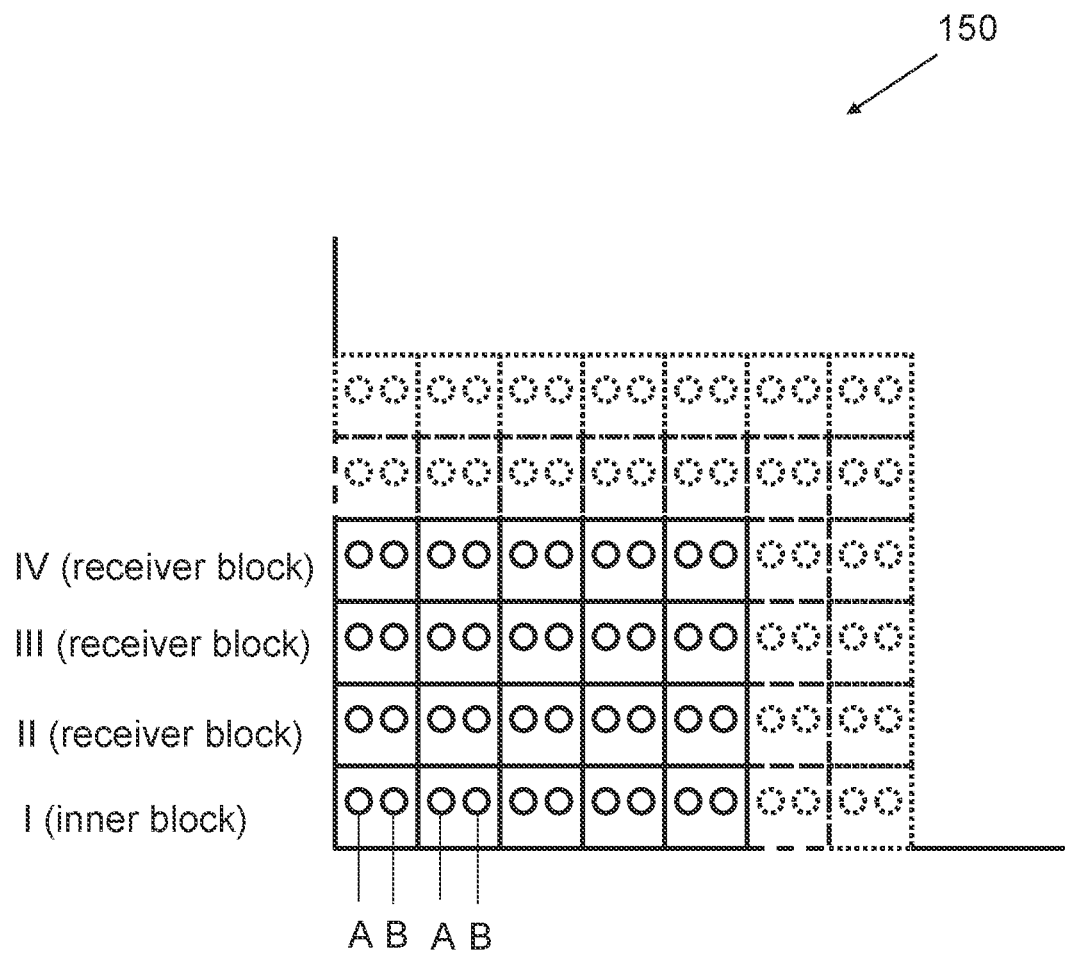
FIG. 2 shows schematically a receiver matrix with a plurality of first and second sensors.

It should be noted that a different choice regarding the size and orientation of the receiver matrix 150 of the image recorder 120 is possible as well, for example such that, in case of a QVGA image recorder, 320 columns are oriented transversely to the expected direction of movement, i.e. for example in the direction of a door width, while 240 rows are lined up in the direction of movement and are allocated to the receiver blocks $m_i$. A simple structure of a receiver matrix 150 with four blocks I, II, III, IV with respectively one row and 5 columns is shown in FIG. 2.

The first receiver A and the second receiver B of each receiver block II, III, IV are configured to receive signal components of the transmission pulse reflected from certain distance ranges of the door area. The first and second receivers A, B of the inner block I are configured and arranged to receive signal components of the transmission pulse that are reflected in an inner region 201 of the area around the door 200. Subsequently, the reflected signal components received are integrated and stored in a memory unit of the respective receiver.

The control unit 130 is configured to trigger a transmission pulse of the transmitter 110 and to then activate the various receivers of the different blocks for predetermined periods based on a corresponding time regime, which is explained below based on FIGS. 3a and 3b. For each receiver block, the control unit 130 takes into account the orientation of the receiver block and therefore the transit time of a signal component reflected by the glass panels of the door 200, and activates the respective receiver only after an idle period that is longer than said transit time.

In the illustrated embodiment, the evaluation unit 140 is configured to read the stored signal components of the respective receiver and to process them into topography image data and to compare said topography image data with stored reference image data for a free door area. Alternatively, the evaluation unit 140 may be configured to read the stored signal components of the respective receiver, to determine a distance value from it and to compare the respective distance value with a stored reference value for a free door area.

Figure 3A:
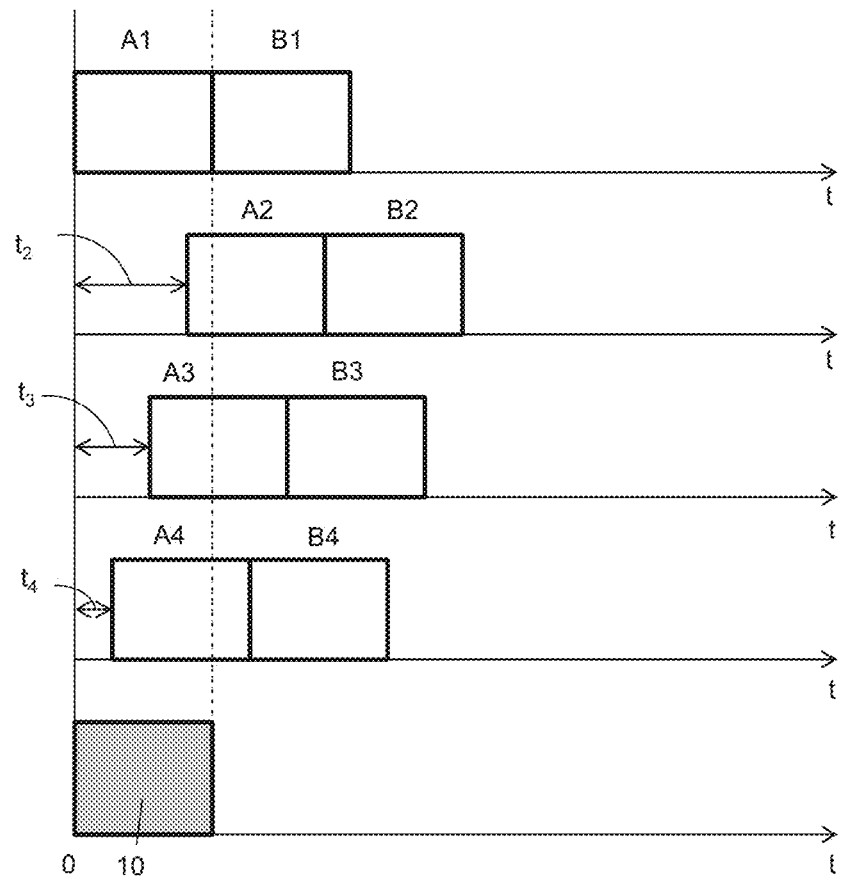
FIGS. 3a and 3b show schematically the method principle of an exemplary embodiment of the method according to the second aspect of the invention.

FIG. 3a shows schematically the method principle of an exemplary embodiment of the method according to the second aspect of the invention and thus the time regime according to which the control unit 130 activates the different receivers An, Bn and triggers the transmitter 110. At the point in time 0, the transmission pulse 10, that in this example has the form of a square pulse of a pulsed laser diode, is triggered. In this example, the transmission pulse 10 has a duration of 30 ns.

After a third idle period of t4=660 ps, the first receivers A4 of the receiver block IV are activated, and, after their first receiving period of 30 ns, the second receivers B4 of the receiver block IV will be activated. The reflected signal components that are at a height distance of 10 cm from the receiver to the ground are stored in the memory units of the receivers A4 and B4. The first reflection at the glass panel at a distance of approximately 10 cm from the image recorder is not received due to the delay of 660 ps.

After a second idle period of t3=1.3 ns, the first receivers A3 of the receiver block III are activated, and, after their first receiving period of 30 ns, the second receivers B3 of the receiver block III will be activated. The reflected signal components that are at a height distance of 20 cm from the receiver to the ground are stored in the memory units of the receivers A3 and B3. The first reflection at the glass panel 200 at a distance of approximately 10 cm from the image recorder is not received due to the delay of 1.3 ns.

After a first idle period of t2=6.6 ps, the first receivers A2 of the receiver block II are activated, and, after their first receiving period of 30 ns, the second receivers B2 of the receiver block II will be activated. The reflected signal components that are at a height distance of 100 cm from the receiver to the ground are stored in the memory units of the receivers A2 and B2. The first reflection at the glass panel at a distance of approximately 100 cm from the image recorder is not received due to the delay of 6.6 ns.

The short idle periods require delay times in the ps (picosecond) range. Since the propagation speed of electrical pulses on a printed circuit board with copper is in the range of 67% of the speed of light in a vacuum, i.e. at approximately 5 ps/mm, the delay times are generated by a delay unit (not shown) integrated in the image recorder 120.

The image recording in the inner block I is carried out without delay, immediately after the transmission pulse has been triggered. As shown in FIG. 1, there is no glass panel in the monitoring field 201 of the inner block I.

An image recording in accordance with the time regime described above may be repeated several times, until the amount of signal electrons obtained in the memory units of the receivers A and B reaches a sufficiently high signal level in all blocks. At that point, the evaluation unit 140 reads the stored signal components of the respective receiver, processes it into topography image data and then evaluates them. To this end, the topography image data are stored in an image memory.

Figure 3B:
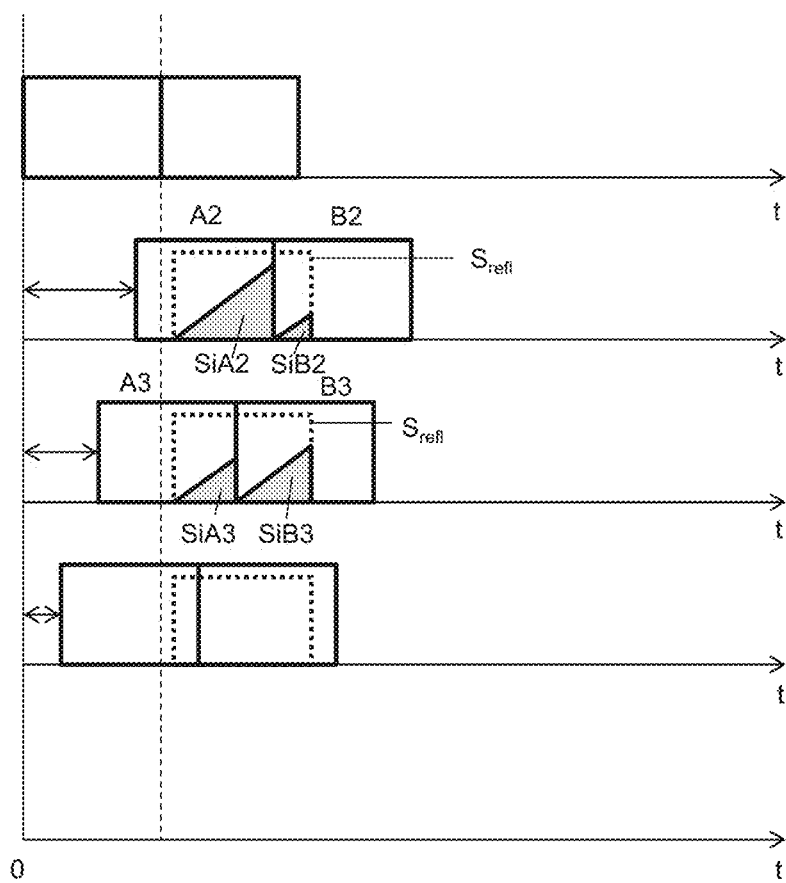

FIG. 3b shows by way of example the reception of reflected signal components and their integration in the receivers A3, B3, A2 and B2. Depending on the arrival of the reflected signal component $S_{refl}$ in relation to the respective receiving time period, different components are attributed to the first receiver and the second receiver, where they are integrated and stored.

Subsequently, it can be determined by means of the comparison between the two integrated signal components $S_{iA3}$ and $S_{iB3}$—or, in case of the second receiver block, $S_{iA2}$ and $S_{iB2}$—in which height range how large a component was reflected, which makes it possible to determine the precise height of the object that has caused the reflection.

Figure 4:
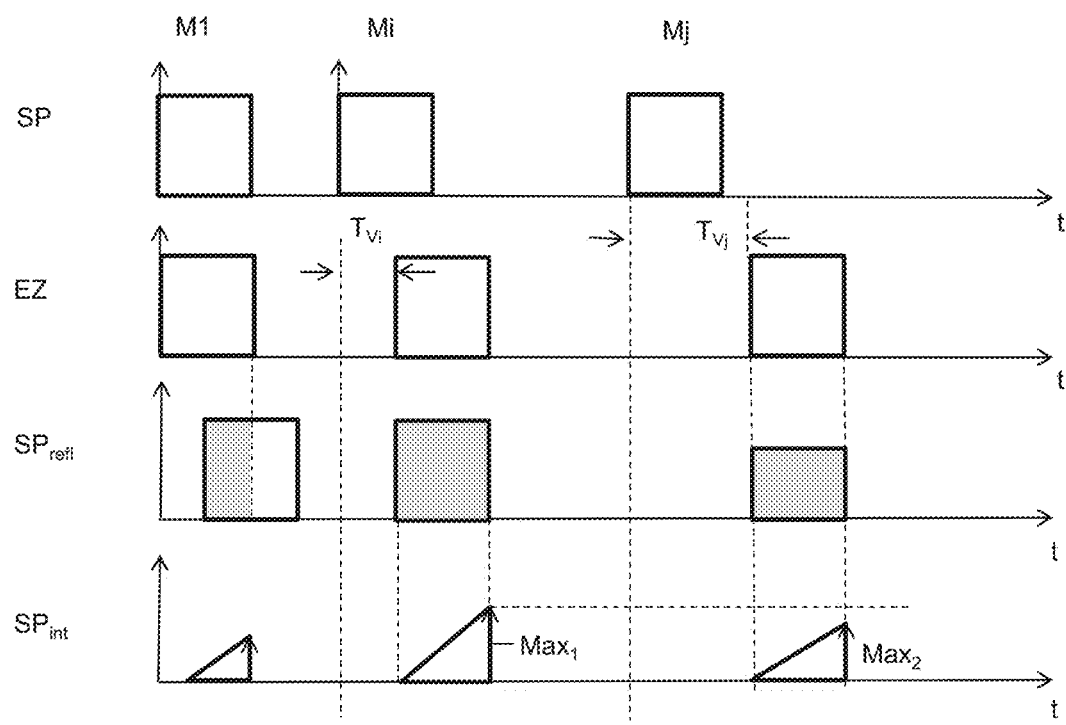
FIG. 4 shows schematically the method principle of an exemplary embodiment of the method according to the third aspect of the invention.

FIG. 4 shows schematically the method principle of an exemplary embodiment of the method according to the third aspect of the invention. In this example, a plurality of transmission pulses SP of electromagnetic radiation are emitted at predetermined time intervals. Upon each transmission pulse M1 ... Mi ... Mj, a delay time for a receiving period EZ is determined, wherein said delay time increases from transmission pulse to transmission pulse. After the respective delay time Tvi ... Tvj, the reflected signal components Sprefl are received and integrated (SPint) for each transmission pulse. In case of the first transmission pulse M1 in the illustration, only a small portion of the reflected signal component is integrated due to the delay between the reflected signal component SPrefl and the receiving period. If the delay time corresponds to the transit time of the signal component reflected by the door, as, in this example, in case of the transmission pulse Mi and the delay time Tvi, the integrated signal components reach a first maximum Max1. If, in a further measurement, in this example the one with transmission pulse Mj, correspondence is once again reached between the delay time Tvj and the transit time of signal components reflected by an object in the monitored outer region, a second maximum Max2 is reached. The first maximum value Max1 is discarded and a distance is determined based on the second maximum value, which was reached at a delay time Tvj that is longer than the delay time Tvi in case of the first maximum value Max1. Subsequently, this distance value is compared with a stored reference value for a free door area.

Figure 5:
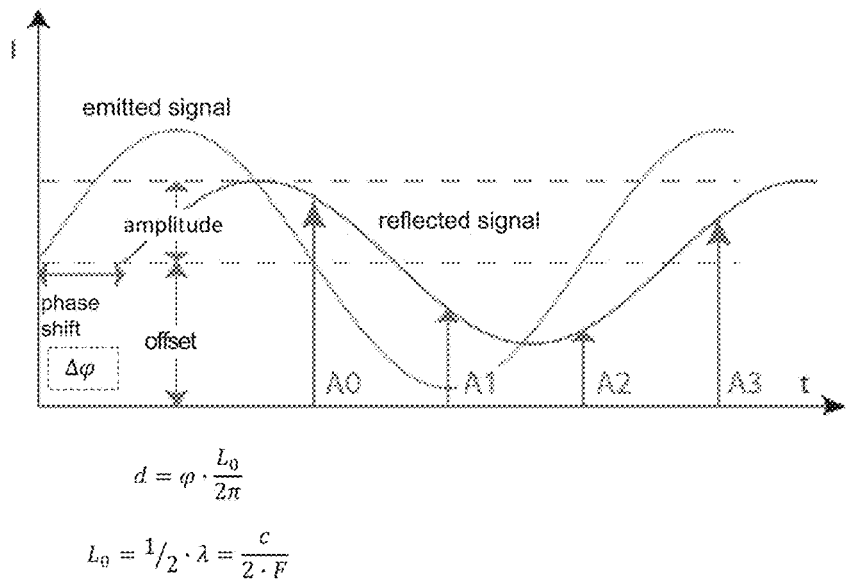
FIG. 5 shows a schematic diagram to explain the transit time measurement when the transmission pulses are sinusoidally modulated light signals.

If a sinusoidally modulated light signal is used for the transmission pulses, the signal transit time and, therefore, the distance value can be determined as shown in FIG. 5.

LIST OF REFERENCE NUMBERS

100 device
110 transmitter
120 image recorder
130 control unit
140 evaluation unit
150 receiver matrix of image recorder 120
200 door
201 monitoring field of inner block I
202 monitoring field of first receiver block II
203 monitoring field of second receiver block III
203 monitoring field of third receiver block IV
I inner block of receiver matrix 150
II first receiver block of receiver matrix 150
III second receiver block of receiver matrix 150
IV third receiver block of receiver matrix 150
A First receiver of a block
B Second receiver of a block

The invention claimed is:

1. A device for monitoring an area around a door that is at least partially glazed, comprising:
    at least one transmitter for emitting at least one transmission pulse of electromagnetic radiation;
    an image recorder comprising a receiver matrix with at least one first receiver blocky which has a plurality of first receivers (A), wherein the first receivers (A) of the first receiver block (II) are configured and arranged in such a way that they receive reflected signal components of the transmission pulse in a first distance range of a region on an outer side of the door, the first distance range being determined in relation to the door, wherein each first receiver of the first receiver block has a memory unit which is configured to integrate and store the reflected signal components received by an associated one of the first receivers;
    a control unit connected to the image recorder and the transmitter, the control unit configured to:
        trigger a transmission pulse of the transmitter; and
        activate the first receivers of the first receiver block for a predetermined first receiving period after a predetermined first idle period, wherein the predetermined first idle period is longer than a transit time in which a signal of the transmission pulse reflected by the door reaches the first receivers of the first receiver block;
    an evaluation unity which is configured to:
        read the stored reflected signal components of the respective first receivers and process topography image data; and
        compare the topography image data with stored reference image data for the area around the door when it is free of persons or objects; or
    the evaluation unit is configured to:
        read the stored reflected signal components of the respective first receivers and determine a distance value between the first receivers of the first receiver block and an object that caused a reflection of the transmission pulse on that basis; and
        compare the respective distance value with a stored reference value for the area around the door when it is free of persons or objects.

2. The device according to claim 1, wherein the receiver matrix further comprises at least one inner block which has a plurality of first receivers, wherein the first receivers of the inner block are configured and arranged to receive reflected signal components of the transmission pulse in a region on an inner side of the door, wherein each first receiver of the inner block has a memory unit that is configured to integrate and store the reflected signal components received, and wherein the control unit is configured to activate the first receivers of the inner block for a predetermined first inner receiving period immediately after the transmission pulse has been triggered.

3. The device according to claim 1, wherein:
    the receiver matrix comprises a second receiver blocky which has a plurality of first receivers, wherein the first receivers of the second receiver block are configured and arranged in such a way that they receive reflected signal components of the transmission pulse in a second distance range of the region on the outer side of the door, the second distance range being determined in relation to the door, wherein each first receiver of the second receiver block has a memory unit in which the reflected signal components received are integrated and stored, and wherein the first distance range is closer to the door than the second distance range; and the control unit is configured to activate the first receivers of the second receiver block for a predetermined second receiving period after a predetermined second idle period, wherein the predetermined second idle period is longer than a transit time in which a signal of the transmission pulse reflected by the door reaches the first receivers of the second receiver block.

4. The device according to claim 1, further comprising a second receiver (B) arranged immediately adjacent to each first receiver of the first receiver block, the second receiver configured and arranged in the same way as the first receiver, wherein each second receiver has a memory unit which is configured to integrate and store the reflected signal components received by the associated second receiver, and wherein the control unit is configured to activate the second receiver for a predetermined delayed receiving period immediately after the first receiving period of the first receivers.

5. The device according to claim 1, wherein the receiver matrix comprises at least one row and at least one column.

6. The device according to claim 1, wherein:
the control unit is configured to trigger a transmission pulse of the transmitter and to activate the first receivers multiple times;
the memory unit of each first receiver is configured to integrate and store the reflected signal components received by the respective first receiver over multiple receiving periods of the first receiver, and
the control unit is configured to activate the evaluation unit only after integration over multiple receiving periods.

7. The device according to claim 6, wherein the control unit is configured to trigger transmission pulses of the transmitter and to activate the first receivers until a point in time when a predetermined signal level is reached in all memory units through integration, and to only activate the evaluation unit at that point in time.

8. The device according to claim 1, wherein the transmitter is a pulsed laser diode with a wavelength in the infrared range.

9. The device according to claim 1, wherein the door is a vehicle door of a bus, a tram or a train.

10. The device according to claim 1, wherein the door is an automatic door.

11. The device according to claim 1, wherein the evaluation unit is configured to:
emit a warning signal; and/or
emit a signal for opening the door or a signal for keeping the door open to a door control unit of the door,
if there are significant differences between the topography image data and the stored reference image data or if the distance value is smaller than a stored reference value.

12. A method for monitoring an area around a door that is at least partially glazed, comprising the steps of:
emitting a transmission pulse of electromagnetic radiation;
receiving reflected signal components of the transmission pulse in a predetermined first distance range of a region on an outer side of the door for a receiving period after a predetermined first idle period which is longer than a transit time in which a signal of the transmission pulse reflected by the door reaches first receivers of a first receiver block;
integrating and storing the reflected signal components received by the first receivers;
reading the stored reflected signal components;
processing the stored reflected signal components into topography image data;
comparing the topography image data with stored reference image data for the area around the door when it is free of persons or objects; and
determining a distance value based on the stored reflected signal components and comparing the distance value with a stored reference value for the area around the door when it is free of persons or objects.

13. A method for monitoring an area around a door that is at least partially glazed, comprising the steps of:
emitting a plurality of transmission pulses of electromagnetic radiation at predetermined time intervals;
determining a delay time for each emission of a transmission pulse, wherein the delay time increases incrementally with each transmission pulse;
receiving a reflected signal component of the each transmission pulse after the respective delay time;
integrating and storing the reflected signal components received for each transmission pulse;
determining a first and a second maximum value of the integrated signal components, wherein the first maximum value was reached at a shorter delay time than the second maximum value;
determining a distance value based on the second maximum value; and
comparing the respective distance value with a stored reference value for the area around the door when it is free of persons or objects.

14. The method according to claim 13, further comprising:
generating topography image data from the respective distance values; and
comparing the topography image data with stored reference image data for the area around the door when it is free of persons or objects.

15. The method according to claim 14, wherein the stored reference image data was recorded at a point in time at which it was known that the area around the door was free of persons or objects.

16. The method according to claim 14, wherein the stored reference image data are generated statically by generating and comparing a plurality of topography image data and by defining such topography image data as reference image data that remains unchanged over a predefined period of time.

17. The method according to claim 14, wherein the reference image data or the stored reference values are stored centrally.

18. The device according to claim 5, wherein the receiver matrix comprises up to 320 rows and up to 240 columns.

19. The method according to claim 12, wherein the stored reference image data are generated statically by generating and comparing a plurality of topography image data and by defining such topography image data as reference image data that remains unchanged over a predefined period of time.

20. The method according to claim 12, wherein the stored reference image data was recorded at a point in time at which it was known that the area around the door was free of persons or objects.

21. The method according to claim 12, wherein the reference image data or the stored reference values are stored centrally.

* * * * *